US006534793B1

(12) United States Patent
Heritier-Best

(10) Patent No.: US 6,534,793 B1
(45) Date of Patent: Mar. 18, 2003

(54) CONTROL VALVE FOR AN EXHAUST GAS RECIRCULATION SYSTEM OF AN INTERNAL COMBUSTION ENGINE

(75) Inventor: Pierre Heritier-Best, Orbeil (FR)

(73) Assignee: Sagem S.A., Paris (FR)

( * ) Notice: Subject to any disclaimer, the term of this patent is extended or adjusted under 35 U.S.C. 154(b) by 0 days.

(21) Appl. No.: 09/581,152

(22) PCT Filed: Dec. 16, 1998

(86) PCT No.: PCT/FR98/02746

§ 371 (c)(1),
(2), (4) Date: Oct. 23, 2000

(87) PCT Pub. No.: WO99/31372

PCT Pub. Date: Jun. 24, 1999

(30) Foreign Application Priority Data

Dec. 16, 1997 (FR) .............................. 97 15916

(51) Int. Cl.[7] .......................................... H01L 31/0312
(52) U.S. Cl. .................... 257/77; 251/129.11; 251/215; 251/251
(58) Field of Search ............................ 251/215, 129.11, 251/220, 229, 251, 77

(56) References Cited

U.S. PATENT DOCUMENTS

| 1,155,576 | A | * | 10/1915 | Isley |
| 1,987,135 | A | * | 1/1935 | Sugden |
| 4,651,969 | A | * | 3/1987 | Dowdall ....................... 251/14 |
| 4,666,124 | A | * | 5/1987 | Giacobbi ...................... 251/56 |
| 5,356,285 | A | * | 10/1994 | Kim ............................. 431/18 |
| 6,007,047 | A | * | 12/1999 | Phipps ......................... 251/252 |

* cited by examiner

Primary Examiner—Henry C. Yuen
Assistant Examiner—David A Bonderer
(74) Attorney, Agent, or Firm—Foley & Lardner

(57) ABSTRACT

The invention relates to a valve for controlling the quantity of exhaust gas recycled in an exhaust gas recirculation system of an internal combustion engine, comprising a shutoff valve (3) disposed in a conduit, rotating drive means (1) and a cam (11) for moving, via said rotating drive means, said shutoff valve from its closed position to an open position and vice versa.

This valve comprises a compensator (9) rotationally integral with the output shaft (2) of the rotating drive means, a transverse axle (12) translationally integral with the shutoff valve and rotationally integral with said compensator, and fixed helical guide grooves (11) in which the ends of said transverse axle are engaged.

3 Claims, 2 Drawing Sheets

CONTROL VALVE FOR AN EXHAUST GAS RECIRCULATION SYSTEM OF AN INTERNAL COMBUSTION ENGINE

BACKGROUND OF THE INVENTION

The present invention relates to a valve for controlling the quantity of exhaust gas recycled in a gas recirculation system of an internal combustion engine.

There are already known exhaust gas recirculation (EGR) systems in internal combustion engines, designed to recycle some of the exhaust gasses to the intake into the cylinders. Such recycling of gasses, which are generally inert and therefore do not participate in the combustion, makes it possible to lower the combustion temperature, which has the effect of reducing the level of nitrogen oxides (NOx) present in the exhaust gas, and consequently to limit the pollution caused by such an engine.

However, in order for the engine to run satisfactorily, such recirculation must only occur under the engine's normal operating conditions, and must consequently be interrupted under all non-nominal circumstances, i.e., essentially when cold, heavily loaded, idling and at high speed. In these cases, no recirculation is allowed, whereas in normal operation, a recirculation of up to 50% by weight of the allowable gasses is permitted. Control is therefore necessary.

It was known to obtain such control by disposing in the recirculation circuit a needle valve in which the position of the needle was controlled by a diaphragm subjected to a more or less substantial negative pressure. The negative pressure source resided in the intake manifold or resulted from a vacuum pump, a solenoid valve being disposed between this manifold and the needle and diaphragm valve. The solenoid itself was fed with intermittent current whose cyclic ratio was determined by a computer to which the temperature of the cooling liquid, the load and the rotation speed of the engine were supplied as input.

Given the drawbacks in these devices linked to the cyclical back pressures prevailing downstream from the needle valve and having a tendency to open the latter, the document FR-A-2.748.780 proposed a valve for controlling the quantity of exhaust gasses recycled in an exhaust gas recirculation system of an internal combustion engine, comprising a shutoff valve disposed in a conduit, rotating drive means, and a cam for moving, via said rotating drive means, said shutoff valve from its closed position to an open position.

More particularly, the above-mentioned document describes such a valve in which the cam comprises a first substantially cylindrical piece integral with the sealing element and rotationally locked, on which are formed helical grooves arranged to cooperate with balls disposed in cells of a second piece integral with the rotating drive means and translationally locked.

Although generally satisfactory, a valve of this type has certain drawbacks.

In the first place, the localized contacts of the balls can cause premature wear on the device.

Moreover, the industrial installation of the balls requires operations that are delicate, and therefore costly.

SUMMARY OF THE INVENTION

The object of the present invention is to eliminate these drawbacks.

To this end, the subject of the invention is a valve for controlling the quantity of exhaust gas recycled in an exhaust gas recirculation system of an internal combustion engine, comprising a shutoff valve disposed in a conduit, rotating drive means, and a cam for moving, via said rotating drive means, said shutoff valve from its closed position to an open position and vice versa, characterized in that it comprises a compensator rotationally integral with the output shaft of the rotating drive means, a transverse axle translationally integral with the shutoff valve and rotationally integral with said compensator, and fixed helical guide grooves in which the ends of said transverse axle are engaged.

The invention consequently makes it possible to eliminate the balls of the prior art, while maintaining the same flexibility of design due to the helical tracks, whose profile can be chosen as desired. In essence, when the transverse axle is driven in rotation by the motor, its ends follow the helical grooves, thus causing a translational movement that is communicated to the shutoff valve. The latter then assumes an axial position that is a function of the angle of rotation of the rotating drive means.

In a particular embodiment of the invention, the two ends of the compensator form forks between whose teeth the ends of the transverse axle are encaged.

These forks make it possible to drive the transverse axle in rotation with precision, while giving it complete axial freedom of movement.

Also in a particular embodiment, the helical grooves are formed in the lateral walls of a cylindrical piece made of two parts, each of these parts forming a ramp, the opposite ramps of the two parts forming said grooves.

This arrangement allows an easy mounting of the transverse axle to the elements in which the grooves are formed, as well as a simplified molding of these elements using simple two-part molds.

BRIEF DESCRIPTION OF THE DRAWINGS

A particular embodiment of the invention will now be described as a non-limiting example, in reference to the attached schematic drawings, in which.

DESCRIPTION OF THE PREFERRED EMBODIMENTS

Figure 1:
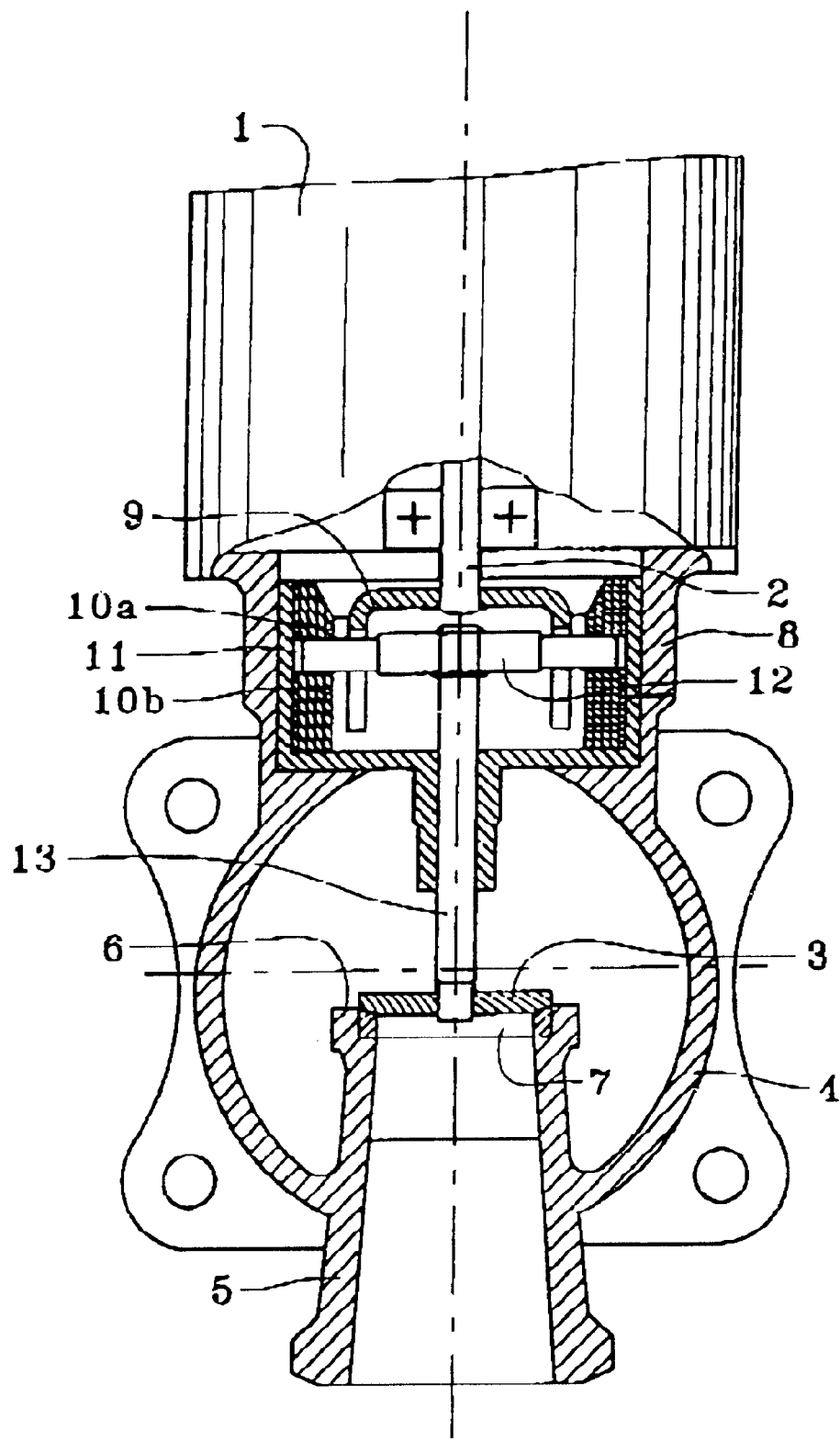
FIG. 1 is an axial sectional view of a valve according to the invention.
Figure 2:
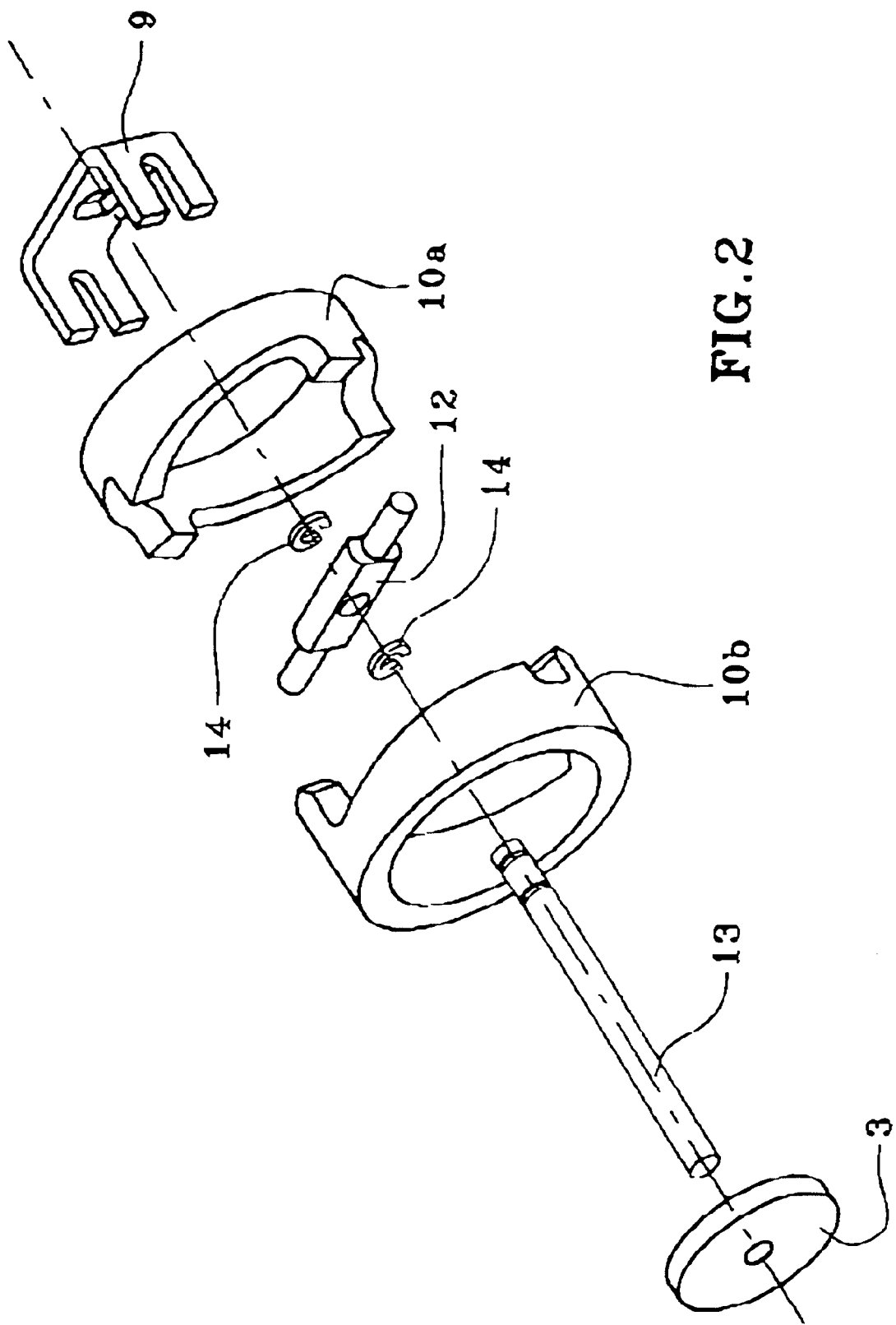
FIG. 2 is an exploded view in perspective of the essential elements of this valve.

The valve represented in FIG. 1 essentially comprises an electric motor 1 whose rotating output shaft 2 is arranged to control the axial position of a valve 3. This axial position makes it possible to determine the value of a flow of gas between a first cylindrical conduit 4 of relatively large section and a second substantially cylindrical conduit 5 of smaller diameter whose axis is generally perpendicular to the axis of the cylindrical conduit 4.

The two conduits in this case are made from just one piece. The end 6 of the conduit 5 inside the conduit 4 supports a valve seat 7 for forming a tight seal with the valve head 3.

The piece constituted by the conduits 4 and 5 is extended opposite the conduit 5 by a housing 8, opening into the conduit 4, for receiving the mechanism for operating the valve 3. The housing 8 is itself extended by a case receiving the above-mentioned motor 1.

The housing 8 first receives a compensator 9, integral in axial translation and in rotation with the output shaft 2 of the motor 1. This compensator is constituted by a U-shaped piece wherein the two branches are in the form of forks. The housing 8 also receives, coaxial with itself, two cylindrical pieces 10a and 10b which, when assembled, delimit two helical grooves 11.

A transverse axle 12 is integral with the stem 13 of the valve 3. The ends of the axle 12 are engaged in the forks at the end of the compensator 9 and in the helical grooves 11.

Finally, the transverse axle 12, in the present case, is mounted on the valve stem 13 by means of two clips 14, allowing a free rotation of the stem 13 relative to the axle 12.

The value just described operates in the following way.

A rotation of the output shaft 2 of the motor 1 drives an equivalent rotation of the compensator 9. The latter also causes the rotation of the transverse axle 12 around the axis of the device. Since the latter is not linked in axial translation but has its ends inserted into the grooves 11, it moves translationally in response to these rotational movements.

In this translational axial movement, the transverse axle 12 causes an axial displacement of the valve head 3 and consequently an adjustment of the flow rate of the valve.

As in the document FR 2 748 780, the grooves 11 cannot be helical in the strict mathematical sense of the word, so the lifting of the valve is not necessarily proportional to the angle of rotation of the motor, but can be adjusted as desired by an appropriate adaptation of the grooves.

What is claimed is:

1. Valve for controlling the quantity of exhaust gas recycled in an exhaust gas recirculation system of an internal combustion engine, comprising a shutoff valve (3) disposed in a conduit, rotating drive means (1) including an output shaft, cam means (11) for moving, via said rotating drive means, said shutoff valve from its closed position to an open position and vice versa, a compensator (9) rotationally integral with the output shaft (2) of the rotating drive means, a transverse axle (12) translationally integral with the shutoff valve and rotationally integral with said compensator, and fixed helical guide grooves (11) in which the ends of said transverse axle are engaged, said transverse axle being rotationally independent with respect to the shutoff valve.

2. Control valve according to claim 1, wherein the two ends of the compensator form forks between whose teeth the ends of the transverse axle are engaged.

3. Control valve according to claim 1, wherein the helical grooves are formed in the lateral walls of a cylindrical piece made of two parts (10a, 10b), each of these parts forming a ramp, the opposite ramps of the two parts forming said grooves.

* * * * *